United States Patent
Mochizuki et al.

(10) Patent No.: US 9,445,322 B2
(45) Date of Patent: Sep. 13, 2016

(54) DATA COMMUNICATION METHOD AND MOBILE COMMUNICATION SYSTEM

(71) Applicant: TCL COMMUNICATION TECHNOLOGY HOLDINGS LIMITED, Kowloon (HK)

(72) Inventors: Mitsuru Mochizuki, Tokyo (JP); Miho Maeda, Tokyo (JP); Yasushi Iwane, Tokyo (JP); Noriyuki Fukui, Tokyo (JP); Tetsuya Mishuku, Tokyo (JP); Michiaki Takano, Tokyo (JP); Ryoichi Fujie, Tokyo (JP); Shigenori Tani, Tokyo (JP); Akira Okubo, Tokyo (JP); Keisuke Ozaki, Tokyo (JP)

(73) Assignee: TCL COMMUNICATION TECHNOLOGY HOLDINGS LIMITED, Kowloon (HK)

( * ) Notice: Subject to any disclaimer, the term of this patent is extended or adjusted under 35 U.S.C. 154(b) by 0 days.

(21) Appl. No.: 14/298,168

(22) Filed: Jun. 6, 2014

(65) Prior Publication Data

US 2014/0286187 A1 Sep. 25, 2014

Related U.S. Application Data

(60) Division of application No. 12/974,814, filed on Dec. 21, 2010, now abandoned, which is a continuation of application No. 12/278,357, filed as application No. PCT/JP2006/319015 on Sep. 26, 2006, now Pat. No. 7,885,235.

(51) Int. Cl.
*H04W 4/00* (2009.01)
*H04W 36/00* (2009.01)
(Continued)

(52) U.S. Cl.
CPC .......... *H04W 36/0072* (2013.01); *H04L 5/006* (2013.01); *H04W 4/06* (2013.01);
(Continued)

(58) Field of Classification Search
None
See application file for complete search history.

(56) References Cited

U.S. PATENT DOCUMENTS 7,042,858 B1 5/2006 Ma et al.
7,885,235 B2 2/2011 Mochizuki et al.
(Continued)

FOREIGN PATENT DOCUMENTS

EP 1 372 350 A1 12/2003
EP 1 509 056 A2 2/2005
(Continued)

OTHER PUBLICATIONS

U.S. Appl. No. 14/534,958, filed Nov. 6, 2014, Mochizuki, et al.
(Continued)

*Primary Examiner* — Anh-Vu Ly
(74) *Attorney, Agent, or Firm* — Shimokaji IP

(57) ABSTRACT

Since OFDM (Orthogonal Frequency Division Multiplexing), which is a downlink access scheme used for an LTE (Long Term Evolution) communication system, is weak at interference, it is preferable that the number of base stations for transmitting the same E-MBMS (Evolved Multimedia Broadcast Multicast Service) data be not excessive.
Thus, the mobile terminal performs: processing of obtaining measurement quality values by measuring reception quality of each base station; processing of deciding on whether the measurement quality value of a serving base station exceeds a certain receiving level; processing of adding measurement quality values of other base stations to the measurement quality value of the serving base station until the sum exceeds the certain receiving level; and processing of notifying the serving base station of the serving base station and other base stations as candidates for an active set for E-MBMS. This makes it possible to select as the active set for E-MBMS an appropriate number of base stations that make it compatible to maintain good reception quality and to prevent interference.

3 Claims, 11 Drawing Sheets

(51) Int. Cl.
*H04W 4/06* (2009.01)
*H04W 24/00* (2009.01)
*H04W 36/18* (2009.01)
*H04W 48/20* (2009.01)
*H04W 72/00* (2009.01)
*H04L 5/00* (2006.01)
*H04W 72/12* (2009.01)

(52) U.S. Cl.
CPC ........... *H04W 24/00* (2013.01); *H04W 36/18* (2013.01); *H04W 48/20* (2013.01); *H04W 72/005* (2013.01); *H04L 5/0023* (2013.01); *H04W 72/12* (2013.01)

(56) References Cited

U.S. PATENT DOCUMENTS

| | | | |
|---|---|---|---|
| 8,149,749 | B2 | 4/2012 | Maeda et al. |
| 8,626,163 | B2 | 1/2014 | Maeda et al. |
| 8,660,046 | B2 | 2/2014 | Maeda et al. |
| 2003/0088695 | A1* | 5/2003 | Kwak et al. ............... 709/238 |
| 2003/0119452 | A1* | 6/2003 | Kim ................... H04W 52/143 455/69 |
| 2003/0231612 | A1 | 12/2003 | Kim et al. |
| 2004/0176094 | A1 | 9/2004 | Kim et al. |
| 2005/0063339 | A1* | 3/2005 | Jeong et al. ............... 370/331 |
| 2005/0101328 | A1 | 5/2005 | Son et al. |
| 2006/0063531 | A1 | 3/2006 | Jung et al. |
| 2006/0067206 | A1* | 3/2006 | Mantravadi et al. ........ 370/208 |
| 2006/0146745 | A1 | 7/2006 | Cai et al. |
| 2006/0182063 | A1 | 8/2006 | Ma et al. |
| 2006/0286997 | A1 | 12/2006 | Seki et al. |
| 2008/0159235 | A1 | 7/2008 | Son et al. |
| 2008/0205322 | A1 | 8/2008 | Cai et al. |
| 2008/0273497 | A1 | 11/2008 | Lu et al. |
| 2009/0103494 | A1 | 4/2009 | Ma et al. |
| 2010/0178895 | A1 | 7/2010 | Maeda et al. |
| 2011/0096751 | A1 | 4/2011 | Ma et al. |
| 2011/0176515 | A1 | 7/2011 | Son et al. |
| 2011/0216732 | A1 | 9/2011 | Maeda et al. |
| 2011/0261777 | A1 | 10/2011 | Maeda et al. |
| 2011/0280223 | A1 | 11/2011 | Maeda et al. |
| 2012/0044870 | A1 | 2/2012 | Mochizuki et al. |
| 2012/0044910 | A1 | 2/2012 | Maeda et al. |
| 2012/0087314 | A1 | 4/2012 | Maeda et al. |
| 2012/0170485 | A1 | 7/2012 | Maeda et al. |
| 2012/0196603 | A1 | 8/2012 | Mochizuki et al. |
| 2014/0056201 | A1 | 2/2014 | Maeda et al. |

FOREIGN PATENT DOCUMENTS

| | | |
|---|---|---|
| EP | 1 530 385 A2 | 5/2005 |
| EP | 1 530 385 A3 | 5/2005 |
| JP | 2001-510974 | 8/2001 |
| JP | 2001510974 A | 8/2001 |
| JP | 2002-513527 | 5/2002 |
| JP | 2002513527 A | 5/2002 |
| JP | 2003-124877 | 4/2003 |
| JP | 2003-525533 | 8/2003 |
| JP | 2004-023774 | 1/2004 |
| JP | 2004023774 A | 1/2004 |
| JP | 2005-124179 | 5/2005 |
| JP | 2005124179 A | 5/2005 |
| JP | 2006-217495 | 8/2006 |
| JP | 2008-536217 | 9/2008 |
| WO | WO 03/081938 A1 | 10/2003 |
| WO | WO 2005/078974 A1 | 8/2005 |

OTHER PUBLICATIONS

The Extended European Search Report issued Dec. 8, 2014, in Application No. / Patent No. 14177974.4-1854.
Tallinn, Estonia, "SFN-Clustered Multicast MBMS," 3GPP TSG RAN WG3 Meeting #53, R3-061205, Mitsubishi Electric pp. 1-4, (2006).
"Feasibility Study for Evolved Universal Terrestrial Radio Access (UTRA) and Universal Terrestrial Radio Access Network (UTRAN)," 3GPP TR 25.912 V.7.0.0, Release 7, pp. 4-57, (2006).
"Intra-Frequency Reporting Events for FDD," 3GPP TS 25.331, V6.10.0, (2006).
Japanese Office Action issued Nov. 29, 2011, in Patent Application No. 2010-281733 (with English-language translation).
Extended European Search Report issued Mar. 2, 2012 in patent application No. 06810540.2.
Siemens, "LTE MBMS", 3GPP TSG-RAN WG RAN2, vol. R2-060931, No. 52, XP002543759, Mar. 27-31, 2006, 4 pages.
Search report from PCT application No. PCT/JP2006/319015 dated Oct. 19, 2006.

* cited by examiner

DATA COMMUNICATION METHOD AND MOBILE COMMUNICATION SYSTEM

CROSS-REFERENCE TO RELATED APPLICATIONS

This application is a divisional of U.S. application Ser. No. 12/974,814 filed Dec. 21, 2010, which is a continuation of U.S. application Ser. No. 12/278,357 filed Aug. 5, 2008, the entire contents of both of which are incorporated herein by reference. U.S. application Ser. No. 12/278,357 is a National Stage of Application No. PCT/JP06/319015 filed Sep. 26, 2006.

TECHNICAL FIELD

The present invention relates to a mobile communication system in which a base station performs radio communication with a plurality of mobile terminals, and particularly to a data communication method and a mobile communication system for providing multimedia multicast/broadcast service to the mobile terminals.

BACKGROUND ART

Among the so-called third generation communication schemes, commercial service of a W-CDMA (Wideband Code division Multiple Access) scheme has started from 2001 in Japan. In addition, HSDPA (High Speed Downlink Packet Access) service is scheduled to start which implements higher speed data transmission using a downlink by adding a channel (HS-DSCH: High Speed-Downlink Shared Channel) for packet transmission to the downlink (dedicated data channel and dedicated control channel). Furthermore, to further speed up uplink data transmission, an HSUPA (High Speed Uplink Packet Access) scheme has been proposed and investigated. The W-CDMA is a communication scheme determined by 3GPP (3rd Generation Partnership Project), a standardization organization of mobile communication systems, and specifications of a sixth release version have been arranged at present.

In addition, as communication schemes other than W-CDMA, 3GPP investigates new communication schemes referred to as "Long Term Evolution" (LTE) for radio sections and "System Architecture Evolution" (SAE) for the total system configuration including a core network. In LTE, an access scheme, radio channel configuration and protocol differ from those of the current W-CDMA (HSDPA/HSUPA). For example, as for the access scheme, although W-CDMA employs CDMA (Code Division Multiple Access), LTE uses OFDM (Orthogonal Frequency Division Multiplexing) in the downlink direction, and SC-FDMA (Single Carrier Frequency Division Multiple Access) in the uplink direction. In addition, as for a bandwidth, although W-CDMA is 5 MHz, LTE can use 1.25/2.5/5/10/15/20 MHz. Besides, LTE does not employ circuit switching as W-CDMA does, but uses only a packet communication scheme.

Since LTE employs a new core network different from the core network (GPRS) of W-CDMA to construct a communication system, it is defined as a radio access network independent of a W-CDMA network. Accordingly, to distinguish from the W-CDMA communication system, in the LTE communication system, a base station for performing communication with mobile terminal UE (User Equipment) is called eNB (E-UTRAN NodeB), and a base station controller (Radio Network Controller) for transferring control data and user data between it and a plurality of base stations is called an aGW (Access Gateway). The multimedia multicast/broadcast service carried out by the LTE communication system is referred to as E-MBMS (Evolved Multimedia Broadcast Multicast Service), and transmits masses of broadcasting mass contents such as news, weather forecasts and mobile broadcasting to a plurality of mobile terminals. It is also referred to as point to multipoint service. A base station transmits E-MBMS data to mobile terminals by mapping the E-MBMS data on a DL-SCH (Downlink Shared Channel) or on an MCH (Multicast Channel). In addition, LTE provides not only broadcast communication service, but also communication service to each of the plurality of mobile terminals. The communication service for the individual mobile terminals is referred to as Unicast service. Since LTE differs from W-CDMA in that it does not have dedicated channels (Dedicated Channel and Dedicated Physical Channel) for the individual mobile terminals in the transport channel and physical channel, it carries out the data transmission to the individual mobile terminals through a shared channel.

An LTE communication system has two types of transmission modes in the E-MBMS service it provides: a multi-cell transmission mode and a single-cell transmission mode. In the multi-cell transmission, a plurality of base stations transmit the same E-MBMS broadcast service at the same frequency so that a mobile terminal can combine E-MBMS data sent from a plurality of base stations. The E-MBMS data is mapped onto an MCH to be transmitted. On the other hand, in the single-cell transmission, the same E-MBMS broadcast service is transmitted within only one cell. In this case, the E-MBMS data is mapped onto a DL-SCH to be transmitted. In the single-cell transmission, each base station can transmit the E-MBMS data at a different frequency. To enable the mobile terminal to receive the multi-cell transmitted E-MBMS data and to combine the E-MBMS data, it is necessary to suppress inter-symbol interference which is interference between the E-MBMS data transmitted from a plurality of base stations. To handle the foregoing problem, Non-Patent Document 1 discloses a base station that transmits, at the multi-cell transmission, the E-MBMS data in such a manner that the timing difference in the reception by a mobile terminal falls within an OFDM guard interval (referred to as "OFDM guard interval CP (Cycle Prefix)").

Non-Patent Document 1: 3GPP TR25.912 V7.0.0.

Although the LTE communication system employs OFDM as the access scheme for the downlink transmission, OFDM is considered to be an access scheme that is comparatively weak at interference. Thus, even if a plurality of base stations carry out multi-cell transmission that transmits the same E-MBMS data, the number of the transmitting base stations is preferably determined at an appropriate number from the point of view of the interference suppression. In addition, transmission from an unnecessary base station not only brings about interference, but also is undesirable from the point of view of the effective use of radio resources. Non-Patent Document 2 discloses a communication method of transmitting the E-MBMS data to a mobile terminal that sends a request only from a base station that receives from the mobile terminal the reception request (counting or entry (such as entry, subscribe and activation)) for the E-MBMS service (content) and from the neighboring base stations of the base station. However, Non-Patent Document 2 does not describe a manner of selecting the base stations that transmit the E-MBMS data to the mobile terminal that transmits the reception request.

Non-Patent Document 2: 3GPP R3-061205.

As a technique for a mobile terminal to receive and combine the same data transmitted from a plurality of base stations, there is RAKE combining at a soft handover. The RAKE combining is applied to a communication system using the third-generation W-CDMA access scheme. When the mobile terminal is located close to a region at which the base station is switched, a plurality of base stations in its adjacent cells transmit the same dedicated data (DPDCH: Dedicated Physical Data Channel) to the mobile terminal. In the W-CDMA system, since each base station multiplies a different scramble code, the mobile terminal carries out receiving processing (despreading) separately for the received signal from each of a plurality of base stations to combine the data from the plurality of base stations. For example, the mobile terminal which can receive the data from three base stations and perform RAKE combining of them must have three branches of receiving sections (such as despreading sections) to perform receiving processing of the received data from each base station separately.

At the soft handover, an active set for the soft handover is created as a set of the base stations that transmit the same dedicated data to the mobile terminal. As for the number of articles contained in the active set, although it is variable according to the receiving capability of the mobile terminal (such as the number of base stations that can undergo receiving processing simultaneously) or according to instructions from the communication system, its upper limit is set at six in the present state of things. FIG. 13 is a diagram for explaining the processing of creating the active set for the soft handover. In the graph shown in FIG. 13, the vertical axis represents measurement quality obtained by measuring by the mobile terminal the signal received from the base station, and the horizontal axis indicates time. The mobile terminal measures the powers of the received signals from first to third base stations, thereby measuring reception qualities. At time T4, the curve of the first base station crosses the curve of the second base station, which means that the measurement quality of the second base station exceeds the measurement quality of the first base station at time T4. Broken lines on FIG. 13, which represent the curve of the first base station before time T4 and the curve of the second base station after time T4, indicate the highest measurement quality among the reception qualities of the signals the mobile terminal is receiving from the plurality of base stations. In addition, dash-dotted lines, which denote a curve obtained from the curve indicating the highest measurement quality represented by the broken lines and a "reporting range" of which the network side notifies the mobile terminal, represent the receiving level obtained by subtracting the reporting range from the values of the highest measurement quality (receiving level denoted by the broken lines). The dash-dotted lines on the graph are used as a dynamic threshold for creating the active set for the soft handover.

At time T1 in FIG. 13, the received signals from the first base station and second base station show measurement qualities higher than the threshold denoted by the dash-dotted lines. Accordingly, at time T1, both the first base station and second base station become the base station candidates for the active set for the soft handover. On the other hand, at time T2, since the received signal from the third base station exceeds the threshold denoted by the dash-dotted lines, third base station is added as a new base station candidate for the active set for the soft handover. Here, the mobile terminal transmits an additional event for making the third base station an additional candidate for the active set. At time T3, since the received signal from the third base station falls below the threshold denoted by the dash-dotted lines, the third base station becomes a candidate to be deleted from the base station candidates for the active set for the soft handover. Here, the mobile terminal transmits a delete event for deleting the third base station from the active set. As described above, the threshold for making a decision of the additional or delete base station candidate is obtained by subtracting the reporting range from the highest measurement quality values. The highest measurement quality values vary in accordance with the distance from the base station to the mobile terminal and the like. In other words, the threshold is a dynamic threshold that varies in accordance with the receiving conditions of the mobile terminal. As for the selection of the active set for the soft handover, Non-Patent Document 3 describes it.

Non-Patent Document 3: 3GPP TS25.331 V6.10.0.

Furthermore, a method and a system for performing a handoff by using the dynamic threshold that adaptively varies as described above are described in Patent Document 1. Patent Document 1 discloses that the adaptive dynamic threshold is determined by a function of quality levels of the highest transmission source and the lowest transmission source of the base stations (transmission sources) contained in the active set.

Patent Document 1: Japanese Patent Laid-Open No. 2003-525533.

DISCLOSURE OF THE INVENTION

Problems to be Solved by the Present Invention

Incidentally, deciding the base station(s) for transmitting the E-MBMS data by using the method of creating the active set for the soft handover is considered to entail the following problems. As described above, the dedicated data the mobile terminal receives at the soft handover has passed through the spreading processing using a scramble code peculiar to each base station, and the mobile terminal despreads the received signal from each base station using the scramble code peculiar to the base station. Accordingly, the number of the base stations the mobile terminal can receive at the soft handover is restricted by the receiving capability of the mobile terminal (such as the number of the receiving sections for performing the despreading). On the other hand, in the case of E-MBMS, an LTE communication system transmits data using a common channel rather than a dedicated channel. In addition, it differs from the third-generation communication system in that the transmission data does not undergo the spreading processing using the scramble code peculiar to the base station. In other words, since a mobile terminal in the LTE communication system can simply combine the E-MEMS data received from a plurality of base stations, the number of the base stations the mobile terminal can receive is not limited.

A set of one or more base stations that transmit E-MBMS data to a particular mobile terminal is referred to as "active set for E-MBMS" in the following description for convenience sake. When the number of the base stations contained in the active set for E-MBMS is low, there are some cases where the mobile terminal cannot maintain the reception quality of the E-MBMS data. On the other hand, an increasing number of the base stations will improve the reception quality of the E-MBMS data because of the combining processing by the mobile terminal. However, transmission of the E-MBMS data from too many base stations is not appropriate from the viewpoint of making effective use of the radio resources. In the method of selecting base stations (method of determining the active set for the soft handover) using the dynamic threshold (dash-dotted line of FIG. 13) that is determined from the relationship between the reporting range of which the network side notifies the mobile terminal and the highest receiving level the mobile terminal measures, since the number of the base stations within the reporting range of FIG. 13 cannot be estimated, processing will sometimes become necessary for altering the reporting range depending on the number of the base stations included in the active set for E-MBMS. However, if performing such processing, flexible and quick processing in response to variations in a radio environment cannot be expected.

Means for Solving Problems

The present invention is proposed to solve the foregoing problem, and provides a data communication method executed in a communication system including base stations for carrying out broadcast data transmission for providing point-to-multipoint broadcast communication service using an OFDM (Orthogonal Frequency Division Multiplexing) scheme as a downlink access scheme, and a mobile terminal for receiving and combining the broadcast data transmitted from the plurality of base stations, the data communication method including: selecting processing of selecting one or more base stations for transmitting the broadcast data to the mobile terminal, and of creating a set of the base stations for transmitting the broadcast data, the selecting processing being executed by a serving base station that arranges a transmission and reception schedule of the mobile terminal; and receiving processing of receiving the broadcast data transmitted from the one or more base stations selected by the selecting processing.

The present invention provides a mobile communication system including base stations for carrying out broadcast data transmission for providing point-to-multipoint broadcast communication service using an OFDM (Orthogonal Frequency Division Multiplexing) scheme as a downlink access scheme, and a mobile terminal for receiving and combining the broadcast data transmitted from the plurality of base stations, the mobile communication system being characterized by that the mobile terminal performs candidate base station selecting processing including: processing of obtaining measurement quality values by measuring reception qualities of the one or more base stations from which the mobile terminal receives the broadcast data; processing of making a decision on whether the measurement quality value of the serving base station is higher than a threshold notified by the serving base station; processing of obtaining a sum measurement quality value by adding measurement quality values of other base stations to the measurement quality value of the serving base station until the sum measurement quality value satisfies reception quality defined by the threshold; and processing of notifying, when the sum measurement quality value satisfies the reception quality defined by the threshold, the serving base station of the one or more base stations, whose signals are combined with a signal received from the serving base station, as candidate base stations; and the base station selects from the candidate base stations notified by the mobile terminal one or more base stations for transmitting the broadcast data to the mobile terminal.

Advantages of the Present Invention

The data communication method in accordance with the present invention includes, in a communication system including base stations for carrying out broadcast data transmission for providing point-to-multipoint broadcast communication service using an OFDM (Orthogonal Frequency Division Multiplexing) scheme as a downlink access scheme and a mobile terminal for receiving and combining the broadcast data transmitted from the plurality of base stations, selecting processing of selecting one or more base stations for transmitting the broadcast data to the mobile terminal, and of creating a set of the base stations for transmitting the broadcast data, the selecting processing being executed by a serving base station that arranges a transmission and reception schedule of the mobile terminal; and receiving processing of receiving the broadcast data transmitted from the one or more base stations selected by the selecting processing. Thus, it offers an advantage of being able to select as an active set for E-MBMS an appropriate number of base stations that make it compatible to maintain good reception quality and to prevent interference (and to make efficient use of the radio resources).

The mobile communication system in accordance with the present invention includes base stations for carrying out broadcast data transmission for providing point-to-multipoint broadcast communication service using an OFDM (Orthogonal Frequency Division Multiplexing) scheme as a downlink access scheme, and a mobile terminal for receiving and combining the broadcast data transmitted from the plurality of base stations, and in the mobile communication system the mobile terminal performs candidate base station selecting processing including: processing of obtaining measurement quality values by measuring reception qualities of the one or more base stations from which the mobile terminal receives the broadcast data; processing of making a decision on whether the measurement quality value of the serving base station is higher than a threshold notified by the serving base station; processing of obtaining a sum measurement quality value by adding measurement quality values of other base stations to the measurement quality value of the serving base station until the sum measurement quality value satisfies reception quality defined by the threshold; and processing of notifying, when the sum measurement quality value satisfies the reception quality defined by the threshold, the serving base station of the one or more base stations, whose signals are combined with a signal received from the serving base station, as candidate base stations; and the base station selects from the candidate base stations notified by the mobile terminal one or more base stations for transmitting the broadcast data to the mobile terminal. Thus, it can select an appropriate number of base stations as the active set for E-MBMS, thereby offering an advantage of being able to make it compatible to maintain good reception quality and to prevent interference (and to make efficient use of the radio resources).

EXPLANATION OF SYMBOLS 1 aGW, 2 base station, 3 mobile station, 4 packet data network, 5 service center, 6 protocol processing section, 7 application section, 8 transmission data buffer section, 9 encoder section, 10 modulating section, 11 frequency converting section, 12 antenna, 13 demodulating section, 14 decoding section, 15 control section, 16 aGW communication section, 17 other base station communication section, 18 protocol processing section, 19 transmission data buffer section, 20 encoder section, 21 modulating section, 22 frequency converting section, 23 antenna, 24 demodulating section, 25 decoder section, 26 control section.

BEST MODE FOR CARRYING OUT THE INVENTION

Embodiment 1

Figure 1:
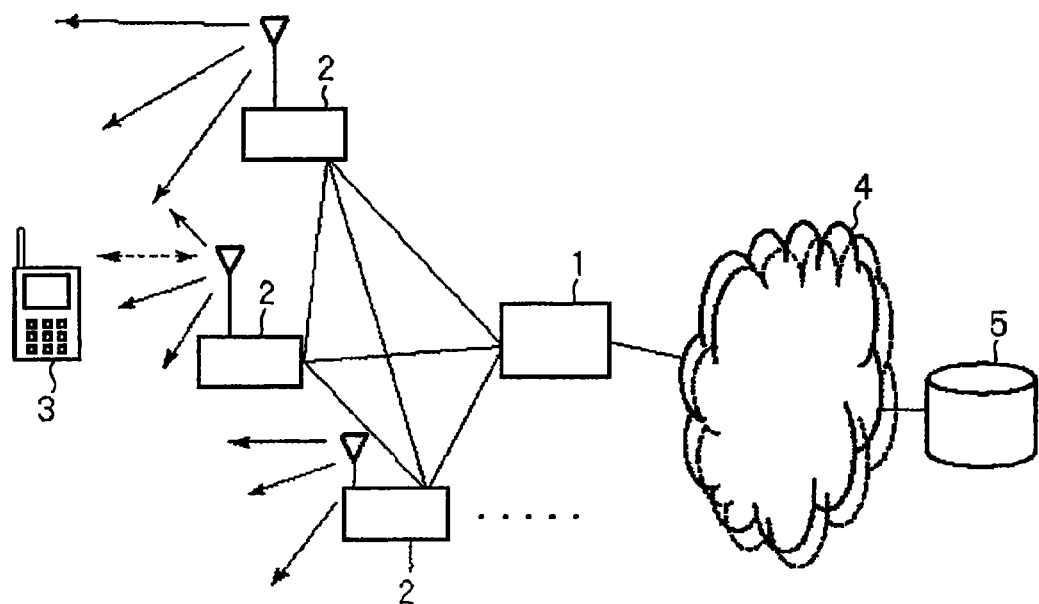
FIG. 1 is a diagram showing a configuration of a mobile communication system in LTE.

FIG. 1 is a diagram showing a configuration of a mobile communication system in LTE. In FIG. 1, an aGW 1 performs transmission and reception of control data and user data with a plurality of base stations (eNodeB) 2, and each base station 2 carries out transmission and reception of data with a plurality of mobile terminals 3. Between the base station 2 and mobile terminal 3, are transmitted broadcast control information, information used for incoming call processing, dedicated control data, dedicated user data, and control data and user data for E-MBMS. In addition, communications between the base stations 2 have been investigated. The base station 2 has an uplink and downlink scheduler. The scheduler enables the transmission and reception of the data between the base station 2 and each mobile terminal 3, and arranges a schedule for improving throughput of the individual mobile terminals 3 and of the entire mobile communication system.

The E-MBMS provides point to multipoint (P to M) broadcast communication service that transmits data from the base station to a plurality of mobile terminals simultaneously. More specifically, information service such as news and a weather forecast and broadcast mass service such as mobile TV have been investigated. The aGW 1 performs communication with a service center 5 via a PDN (Packet Data Network) 4. The service center 5 is an apparatus for keeping and delivering contents for providing the E-MBMS service. A content provider transmits the E-MBMS data such as mobile TV broadcasting data to the service center 5. The service center 5 stores the E-MBMS data, and transmits the E-MBMS data to the base stations 2 via the PDN 4 and aGW 1.

Figure 2:
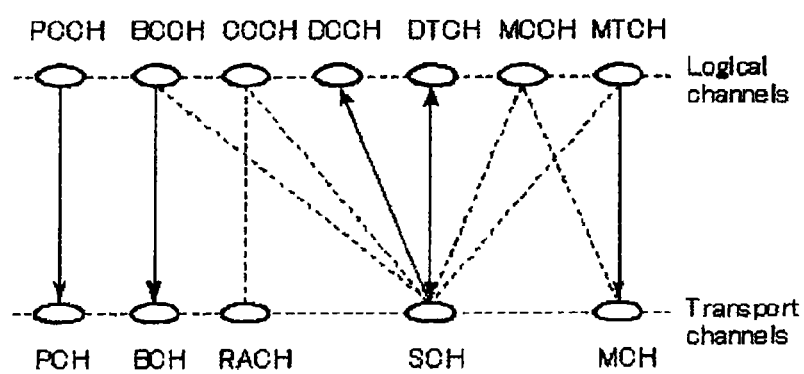
FIG. 2 is a diagram showing an arrangement of channels used in an LTE communication system.

FIG. 2 is a diagram showing a channel arrangement. FIG. 2 shows mapping between logical channels and transport channels. The logical channels are classified according to functions and logical characteristics of a transmission signal. The transport channels are classified according to a transmission mode. The broadcast control information is put on a BCCH (Broadcast Control Channel). The BCCH is mapped onto a BCH (Broadcast Channel), and transmitted from the base station to the mobile terminal. The information used for the incoming call processing is put on a PCCH (Paging Control Channel). The PCCH is mapped onto a PCH (Paging Channel), and transmitted from the base station to the mobile terminals within the cell. The dedicated control data addressed to the individual mobile terminals is put on a DCCH (Dedicated Control Channel).

In addition, the dedicated user data addressed to the individual mobile terminals are put on a DTCH (Dedicated Traffic Channel). The DCCH and DTCH are mapped onto a DL-SCH (Downlink Shared Channel), and transmitted from the base station to the individual mobile terminals separately. Conversely, using a UL-SCH (Uplink Shared Channel), the user data are transmitted from the individual mobile terminals to the base station separately. The DL-SCH is a shared channel. The control data and user data for the E-MBMS are put on an MCCH (Multicast Control Channel) and an MTCH (Multicast Traffic Channel), mapped onto the DL-SCH and MCH (Multicast Channel), respectively, and transmitted from the base station to the mobile terminals. A connection request signal from each mobile terminal is transmitted from the mobile terminal to the base station via a random access channel (RACH).

Figure 3:
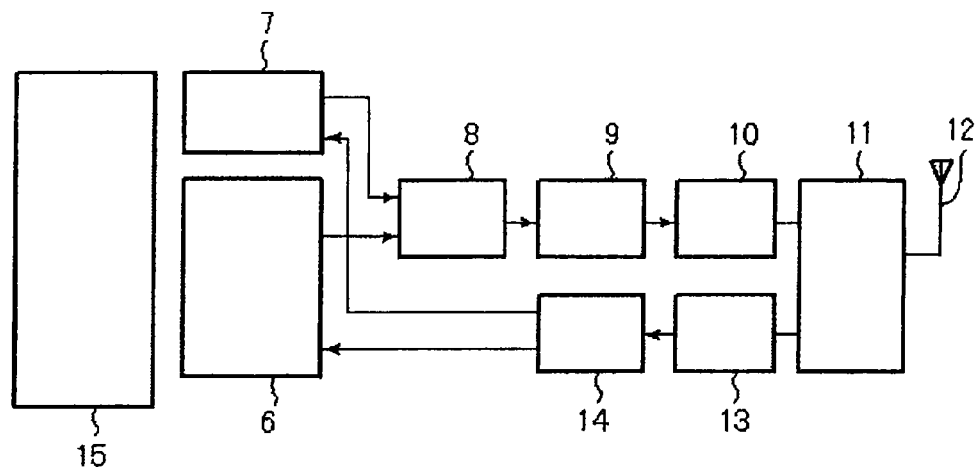
FIG. 3 is a block diagram showing a configuration of a mobile terminal.

FIG. 3 is a block diagram showing a configuration of the mobile terminal. The transmission processing of the mobile terminal 3 is carried out as follows. First, control data from a protocol processing section 6 and user data from an application section 7 are stored in a transmission data buffer section 8. The data stored in the transmission data buffer section 8 is delivered to an encoder section 9 to undergo encoding processing such as error correction. Such data that is supplied from the transmission data buffer section 8 to a modulating section 10 directly without undergoing the encoding processing can also be present. The data passing through the encoding processing in the encoder section 9 is subjected to modulating processing in the modulating section 10. The modulated data is converted to a baseband signal and then supplied to a frequency converting section 11 to be converted to a radio transmission frequency. After that, the transmission signal is sent from an antenna 12 to the base station 2. On the other hand, the receiving processing of the mobile terminal 3 is performed as follows. A radio signal from the base station 2 is received by the antenna 12. The received signal is converted from the radio receiving frequency to a baseband signal by the frequency converting section 11, and undergoes demodulating processing by a demodulating section 13. The data after the demodulation is delivered to a decoder section 14 which carries out decoding processing such as error correction. Among the decoded data, the control data is delivered to the protocol processing section 6, and the user data is delivered to the application section 7. A series of the transmission and reception processing of the mobile terminal is controlled by a control section 15.

Figure 4:
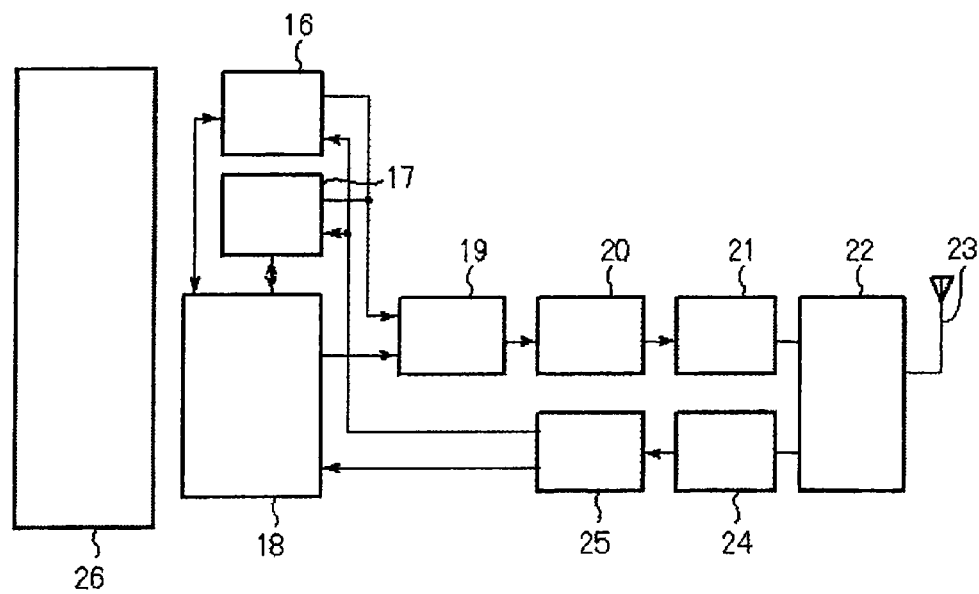
FIG. 4 is a block diagram showing a configuration of a base station.

FIG. 4 is a block diagram showing a configuration of the base station. The transmission processing of the base station 2 is performed as follows. An aGW communication section 16 carries out data transmission and reception between the base station 2 and the aGW 1. One or more other base stations communication section 17 performs data transmission and reception with another base station. The aGW communication section 16 and the one or more other base stations communication section 17 each exchange information with a protocol processing section 18. The control data from the protocol processing section 18 and the user data from the aGW communication section 16 and one or more other base stations communication section 17 are stored in the transmission data buffer section 19. The data stored in the transmission data buffer section 19 are delivered to an encoder section 20 to undergo encoding processing such as error correction. Such data that is supplied from the transmission data buffer section 19 to a modulating section 21 directly without undergoing the encoding processing can also be present. The encoded data is subjected to modulating processing in the modulating section 21.

The modulated data is converted to a baseband signal, and then supplied to a frequency converting section 22 to be converted to a radio transmission frequency. After that, a transmission signal is transmitted from an antenna 23 to one or more mobile terminals 3. On the other hand, the receiving processing of the base station 2 is performed as follows. Radio signals from one or more mobile terminals 3 are received by the antenna 23. The received signal is converted from the radio receiving frequency to a baseband signal by the frequency converting section 22, and a demodulating section 24 performs demodulating processing. The demodulated data is delivered to a decoder section 25 to undergo decoding processing such as error correction. Among the decoded data, the control data is delivered to the protocol processing section 18, and the user data is delivered to the aGW communication section 16 and other base station communication section 17. A series of the transmission and reception processing of the base station 2 is controlled by a control section 26.

Figure 5:
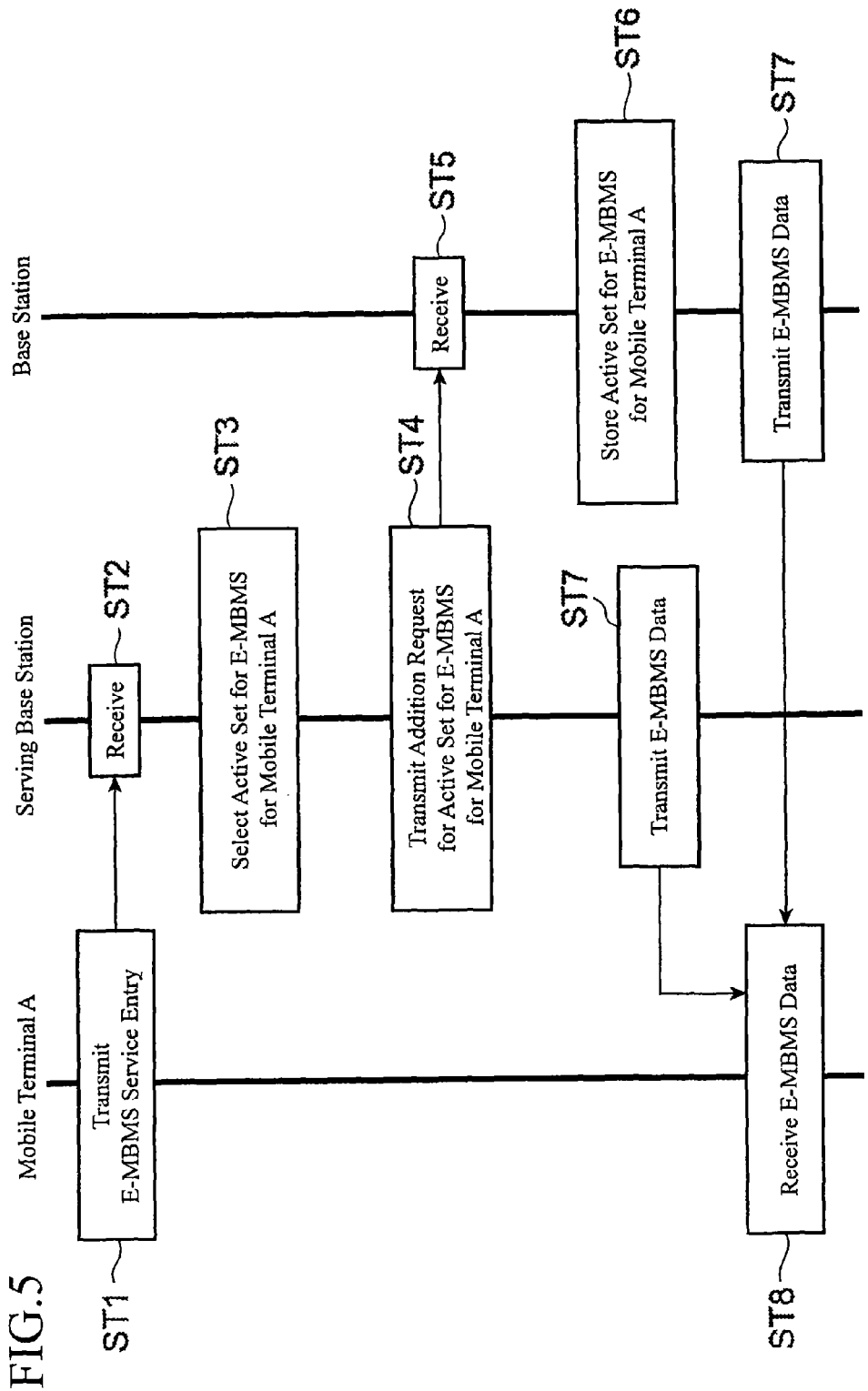
FIG. 5 is a flowchart for explaining processing at a start of E-MBMS data communication.

FIG. 5 is a flowchart for explaining processing at a start of E-MBMS data communication. When a mobile terminal A uses an E-MBMS service, it transmits an E-MBMS service entry to a serving base station (step 1). The serving base station is a base station that takes charge of uplink and downlink scheduling of the mobile terminal, and that receives entry (Counting, or entry (such as Entry, Subscribe or Activation)) indicating a reception request the mobile terminal transmits for receiving the E-MBMS service (content). Receiving the E-MBMS service entry transmitted from the mobile terminal A (step 2), the serving base station selects a base station for transmitting the E-MBMS data to the mobile terminal A. In other words, it performs selecting processing for selecting base stations included in the active set for E-MBMS of the mobile terminal A (step 3). The active set includes the serving base station itself. Details of selecting processing of selecting the active set for E-MBMS will be described later. When the active set for E-MBMS is selected at step 3, the base station that transmits the E-MBMS data to the mobile terminal A is decided. To request the selected base station to transmit the E-MBMS data to the mobile terminal A, the serving base station transmits an addition request for the active set for E-MBMS to one or more base stations included in the active set for E-MBMS at step 4. At step 6, a base station that receives the addition request for the active set for E-MBMS from the serving base station performs the E-MBMS data transmission to the mobile terminal A (step 7). At the same time, the serving base station starts the E-MBMS data transmission to the mobile terminal A as well (step 7). The mobile terminal A receives the E-MBMS data transmitted from the serving base station and the base stations in the active set for E-MBMS, and performs combining of the received data (step 8).

Figure 6:
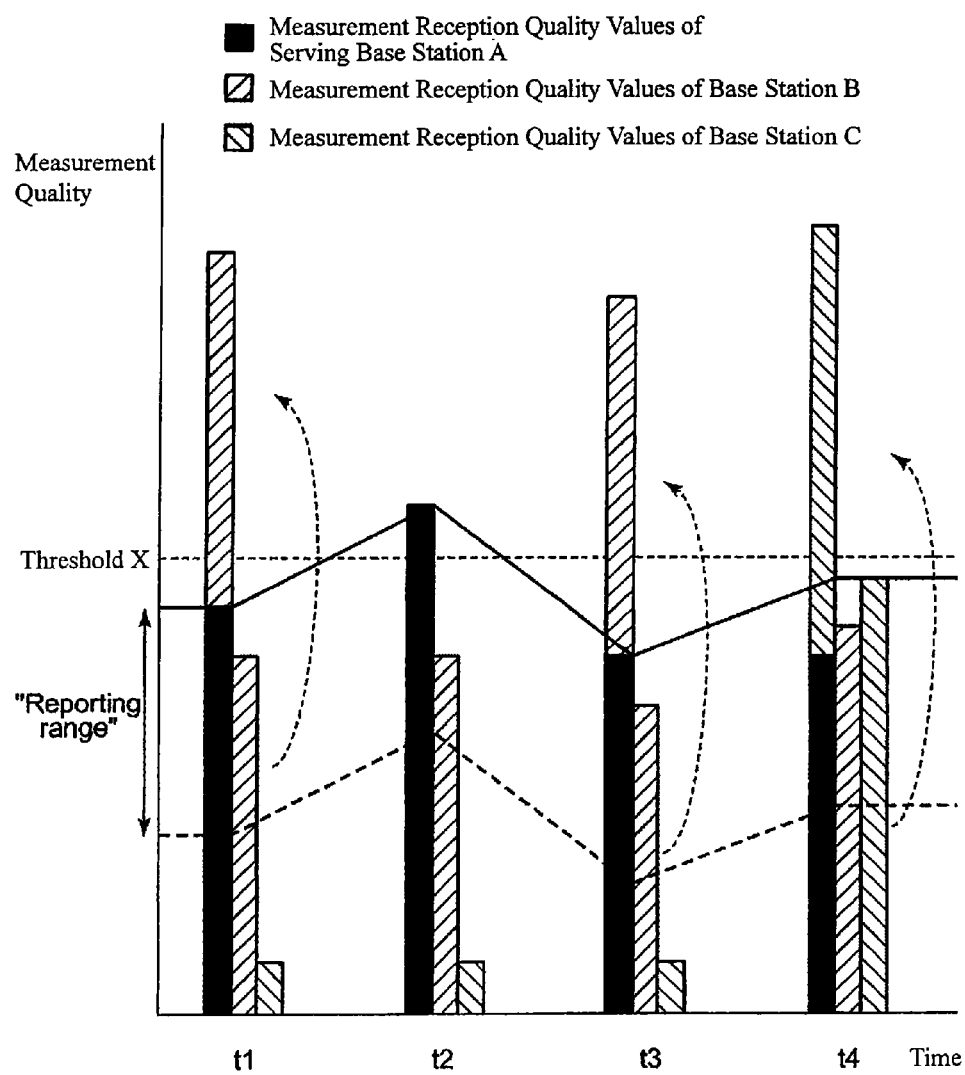
FIG. 6 is a diagram for explaining an idea of the processing of selecting base station candidates for an active set for E-MBMS.

FIG. 6 is a diagram for explaining an idea of the processing of selecting the candidate base stations for the active set for E-MBMS in the mobile terminal. In FIG. 6, the vertical axis represents measurement quality when measuring the received signal from the base station, and the horizontal axis represents time. FIG. 6 shows a bar chart indicating measurement qualities from the serving base station A, and from base stations B and C other than the serving base station at individual times t1, t2, t3 and t4. As shown in FIG. 6, shading patterns of the respective base stations differ from each other in the bar chart. As for a threshold X, it is notified by the serving base station (or possibly by the aGW or service center), and it is conceivable to transmit it from the serving base station to the mobile terminal via a logical channel such as a BCCH, DCCH, or MCCH. In addition, it is also conceivable to transmit it to the mobile terminal by mapping it onto a transport channel such as a BCH, DL-SCH, or MCH. Although the threshold X is a fixed threshold, such an arrangement is also possible in which the serving base station can vary it in accordance with a congestion level or an amount of data transmitted by the E-MBMS service.

At time t1 of FIG. 6, bars indicating the measurement quality values of the serving base station A, base station B and base station C are arranged in descending order of the quality. In addition, it is shown that all the measurement qualities of the serving base station A, base station B and base station C are less than the threshold X. Thus, the mobile terminal cannot achieve the reception quality the threshold X requires if it receives the E-MBMS data from one of the base stations A, B and C alone. However, the sum of the measurement quality value of the serving base station A and the measurement quality value of the base station B exceeds the threshold X. Accordingly, the mobile terminal can achieve the reception quality the threshold X requires by receiving the E-MBMS data from the serving base station A and the E-MBMS data from the base station B with the second highest measurement quality, and by combining the two. In other words, to achieve the reception quality the threshold X requires, there is no necessity to combine the E-MBMS data from all the base stations A-C, but it is enough to combine the E-MBMS data from the base stations A and B. Thus, the mobile terminal selects the base station B as a candidate base station besides the serving base station A that is always assigned as a member of the active set. At time t2 of FIG. 6, the measurement quality of the serving base station A exceeds the threshold X. In other words, to achieve the reception quality the threshold X requires, it is necessary to receive only the serving base station A without receiving the base station B or C. Accordingly, at time t2, the mobile terminal assigns only the serving base station A to the candidate base stations for the active set for E-MBMS, and transmits a delete event for deleting the base station B from the candidate base stations for the active set for E-MBMS.

At time t3 of FIG. 6, since the measurement quality of the serving base station A is less than the threshold X, the mobile terminal must receive the E-MBMS data from the base station B or C. At time t3, since the sum of the measurement quality value of the serving base station A and the measurement quality value of the base station B exceeds the threshold X as at time t1, the mobile terminal performs the processing of adding the base station B to the candidate base stations for the active set for E-MBMS to receive the E-MBMS data from the base station B as well as the E-MBMS data from the serving base station A. In other words, the mobile terminal selects the serving base station A and the base station B as the candidate base stations, and transmits to the serving base station an additional event for adding the base station B, which is the candidate base station, to the active set for E-MBMS. At time t4 of FIG. 6, although it is the same as at time t3 that the measurement quality of the serving base station A is less than the threshold X, it differs from the case of time t3 in that the measurement quality of the serving base station A is less than that of the base station C, and that the measurement quality of the base station C is higher than the measurement quality of the base station B. In this case, since the sum of the measurement quality value of the serving base station A and the measurement quality value of the base station C exceeds the threshold X, the mobile terminal selects the serving base station A and base station C as the candidate base stations to receive the E-MBMS data from the base station C and serving base station A rather than from the base station B. Then, the mobile terminal transmits to the serving base station an update event (delete event of the base station B and additional event of the base station C) for deleting the base station B from the candidate base stations for the active set for E-MBMS and for adding the base station C thereto. The serving base station performs the selecting processing of selecting a base station to be assigned to the active set for E-MBMS from one or more candidate base stations selected by the candidate base station selecting processing executed by the mobile terminal.

According to the candidate base station selecting processing and the active set for E-MBMS selecting processing, the number of the base stations in the candidate base stations for the active set for E-MBMS is two (serving base station A and base station B) at t1, one (serving base station A) at t2, two (serving base station A and base station B) at t3, and two (serving base station A and base station C) at t4. Incidentally, although at time t4 the measurement quality value of the base station C which is highest among the base stations other than the serving base station A is added to the measurement quality value of the serving base station A, and the sum is compared with the threshold X, the measurement quality value of the base station B can be added thereto to be compared with the threshold X. In other words, instead of adding a measurement quality value of a higher quality base station preferentially to the measurement quality value of the serving base station A, it is also possible to add such processing as deciding a base station that has a measurement quality value that will provide, when added to the measurement quality value of the serving base station A, a resultant sum that exceeds the threshold X and is closest to the threshold X. Employing the method can also achieve the advantage of the present application, which makes it compatible to maintain good reception quality and to prevent interference (and to make efficient use of the radio resources).

Figure 13:
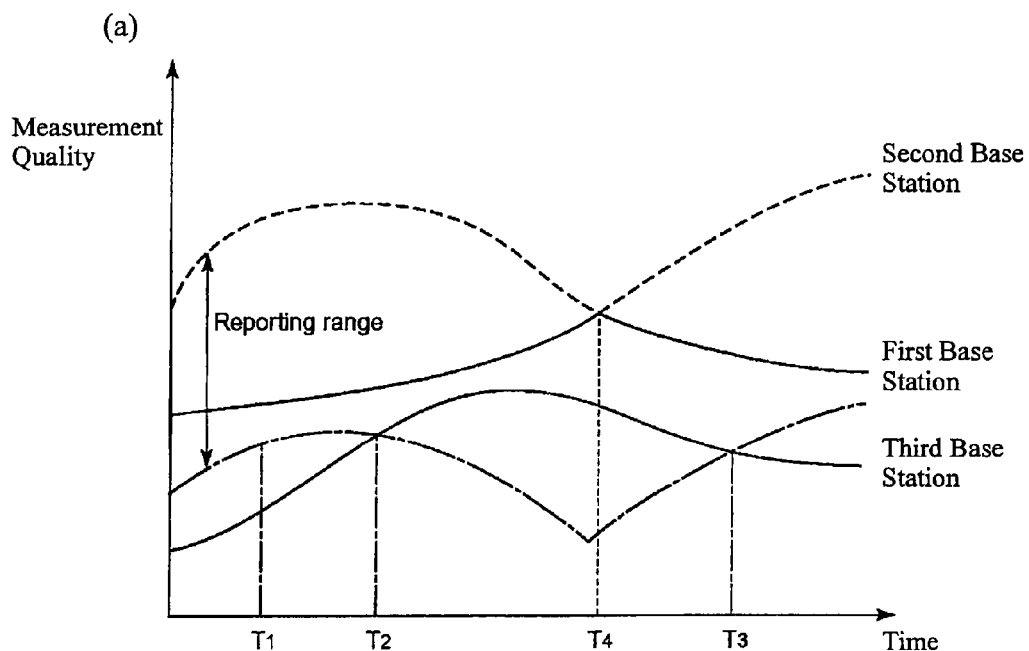
FIG. 13 is a diagram for explaining processing of creating an active set for a soft handover.

Here, referring to FIG. 6, the number of the base stations will be described when using the method of creating the active set for a soft handover. As described above with reference to FIG. 13, the active set for a soft handover supposes as a reference the dynamic threshold which is obtained by subtracting the reporting range from the highest reception quality values among the reception qualities of neighboring base stations the mobile terminal measures. In other words, the mobile terminal notifies the serving base station of all the base stations having the reception quality within a region determined by subtracting the reporting range from the highest reception quality values as the candidate base stations for the active set for a soft handover. The candidate base stations notified by the mobile terminal are added formally to the active set if the serving base station authorizes. Thus, in FIG. 6, the candidate base stations become two (serving base station A and base station B) at t1, two (serving base station A and base station B) at t2, two (serving base station A and base station B) at t3, and three (serving base station A, base station B and base station C) at t4. When creating the active set for E-MBMS in this way using the method of creating the active set for a soft handover, it is found that the number of the base stations is excessive at t2 and t4. As for the E-MBMS data transmission that employs OFDM which is weak at interference as the downlink access scheme, it is preferable that the number of the base stations that transmit to the mobile terminal be as small as possible as long as a certain level of the communication quality is ensured. Accordingly, it is inappropriate to apply the method of creating the active set for a soft handover without change for creating the active set for E-MBMS.

In the candidate base station selecting processing, the mobile terminal measures the reception quality of each base station. As a parameter of the reception quality, there is signal power or a signal to interference ratio (SIR). However, to create an active set for E-MBMS at high accuracy, it is recommended to measure the reception quality of a downlink reference symbol in the frequency band that actually transmits the E-MBMS data (regardless of whether the base station is transmitting the E-MBMS service or not). This is because it is not affected by frequency characteristics.

In addition, in the LTE system, the bandwidth of the base station is specified that it is selected to be used from 1.25/2.5/5/10/15/20 MHz. The receivable bandwidth of the mobile terminal is specified in such a manner as to support a maximum of 20 MHz, and at least 10 MHz. When the receivable bandwidth of the mobile terminal is less than the bandwidth of the base station, the mobile terminal negotiates with the base station, and shifts between positions, that is, carries out processing of changing the center frequency of the radio transmission and reception frequency. The processing is referred to as retuning. Since the retuning imposes a heavy load on the scheduler of the mobile terminal and that of the serving base station, it is desirable not to execute it as much as possible. However, when the E-MBMS data is transmitted at a position different from the position (UE position) at which the center frequency of the mobile terminal is set, retuning becomes necessary to measure the quality of the E-MBMS data. Then, to measure the quality of the E-MBMS data without retuning, the following first method and second method are conceivable.

The first method measures the downlink reference symbol at the UE position, and considers the measurement result as the reception quality in the frequency band in which the E-MBMS service is actually transmitted. The second method considers the result of measuring the reception quality of an SCH or BCH (transport channel) or BCCH (logical channel) the mobile terminal must receive independently of the E-MBMS data reception as the reception quality in the frequency band in which the E-MBMS service is actually transmitted. Using the first method or the second method makes it possible to measure the quality of the candidate base stations to be included in the active set for E-MBMS while lightening the loads of the mobile terminal and serving base station by reducing the retuning. When considering the result measured by the first and second methods as the reception quality in the frequency band that transmits the E-MBMS service, it is also possible for each base station to broadcast an offset value used at conversion through a BCH or the like. The measurement processing described above is implemented by installing it in the demodulating section 13 in the block diagram of the mobile terminal shown in FIG. 3. In addition, the second method is effective measurement processing even if the downlink reference symbol separable for each base station is not transmitted in the transmitted frequency band that actually transmits the E-MBMS data.

Figure 7:
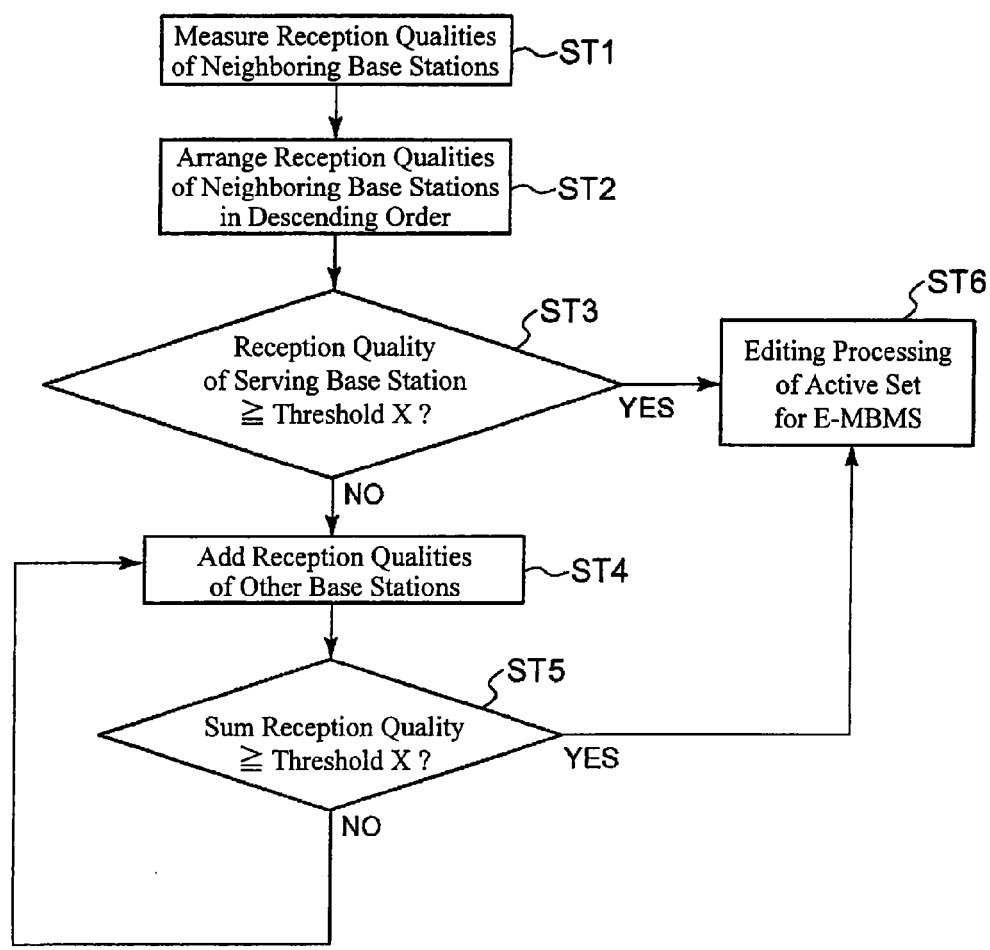
FIG. 7 is a flowchart for explaining processing of creating the active set for E-MBMS.

FIG. 7 is a flowchart for explaining the processing of creating the active set for E-MBMS. The flowchart shown in FIG. 7 illustrates the candidate base station selecting processing mainly executed by the mobile terminal, and partly includes the active set for E-MBMS selecting processing in the serving base station. The mobile terminal selects a candidate for the base station to be included in the active set for E-MBMS, and notifies the serving base station of the candidate base stations. The serving base station selects the base stations belonging to the active set for E-MBMS from the candidate base stations notified by the mobile terminal, and decides them. In FIG. 7, the mobile terminal measures the reception qualities of neighboring base stations (step 1). At step 2, it arranges the measurement qualities of the neighboring base stations in descending order of measurement quality. For example, at time t1 of FIG. 6, the order becomes serving base station A, base station B and base station C. At step 3, the mobile terminal compares the measurement quality of the serving base station A with the threshold X. The serving base station A is always contained in the active set for E-MBMS regardless of the reception quality unless the serving base station is changed. Accordingly, the measurement quality of the serving base station A is selected at first as an item to be compared with the threshold X. At step 3, if the measurement quality of the serving base station A exceeds the threshold X as a result of comparing them (Yes at step 3), the serving base station A can ensure enough quality for the E-MBMS data by itself. Thus, editing processing of the active set for E-MBMS at step 6 is executed.

If the measurement quality of the serving base station A is less than the threshold X (No at step 3), the serving base station A cannot ensure enough quality for the E-MBMS data by itself. Thus, at step 4, the measurement quality value of the base station B, for example, is added to the measurement quality value of the serving base station A. Then, at step 5, the mobile terminal compares the sum measurement quality value resulting from the addition with the threshold X. If the sum measurement quality value exceeds the threshold X (Yes at step 5), the active set editing processing at step 6 is executed. If the sum measurement quality value of the serving base station A and base station B is still less than the threshold X (No at step 5), since the sum of the serving base station A and base station B cannot ensure enough quality for the E-MBMS data, the processing at step 4 and step 5 is further executed. For example, the measurement quality value of the base station C is added to the sum measurement quality value of the serving base station A and base station B, and its result is compared with the threshold X. If the sum measurement quality value of the serving base station A, base station B and base station C exceeds the threshold X (Yes at step 5), the active set editing processing at step 6 is executed. The serving base station is notified of the candidate base stations selected by executing the processing from step 1 to step 5, and executes the processing (editing processing of the active set for E-MBMS) at step 6, thereby deciding the base stations to be included in the active set from the candidate base stations.

The E-MBMS active set editing processing at step 6 is processing of making a decision as to whether it is necessary for one or more base stations that exceed the threshold X to be added to or deleted from the active set for E-MBMS or the candidate base stations by comparing them with the base stations included in the active set for E-MBMS or in the candidate base stations at that point of time; and of requesting, if the addition or deletion of the base stations is necessary, the serving base station to update the active set for E-MBMS. For example, at step 3 of FIG. 7, if the reception quality of the serving base station A exceeds the threshold X (Yes at step 3), it is enough for the active set for E-MBMS to include only the serving base station A. In this case, if the current active set for E-MBMS or the candidate base stations include any base stations other than the serving base station A, the mobile terminal transmits a request (delete event) to delete the base stations other than the serving base station A. Unless the current active set for E-MBMS or the candidate base stations include any base stations other than the serving base station A, no processing occurs. Likewise, at step 5, if the sum reception quality of the serving base station A and base station B exceeds the threshold X (Yes at step 5), it is enough for the candidate base stations included in the active set for E-MBMS to include the serving base station A and base station B. Accordingly, if the current active set for E-MEMS or the candidate base stations include any base stations other than the serving base station A or base station B, the mobile terminal transmits a request (delete event) to delete the unnecessary base station. On the contrary, unless the current active set for E-MBMS includes the base station B, the mobile terminal transmits a request (additional event) to add the base station B. Unless the current active set for E-MBMS or the candidate base stations include any base stations other than the serving base station A and base station B, no processing occurs.

Figure 8:
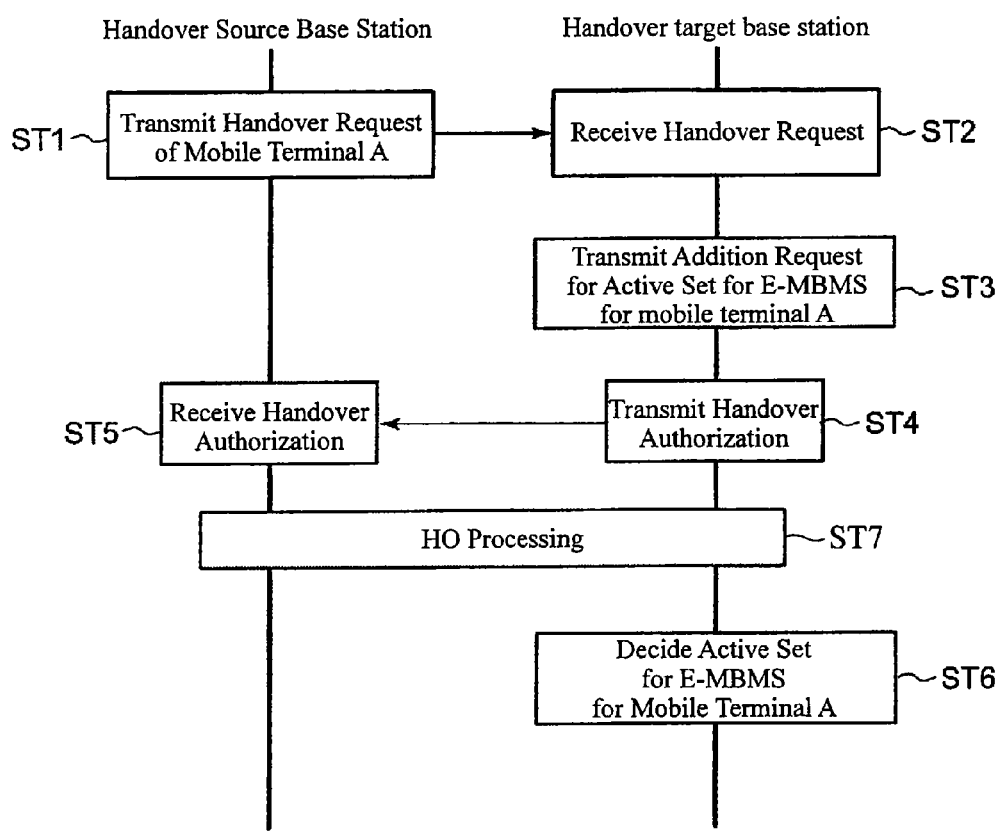
FIG. 8 is a flowchart for explaining processing performed at a handover.

A handover is performed when the mobile terminal moves from a certain cell to another cell. If the handover is performed, the serving base station of the mobile terminal (assumed to be a mobile terminal A) is also switched. When the mobile terminal A uses the E-MBMS service at the handover, the active set for E-MBMS selected and updated by the serving base station of the handover source undergoes new selection and creation by the serving base station of the handover target. FIG. 8 is a flowchart for explaining processing executed at the handover. In FIG. 8, the handover source base station transmits a handover request of the mobile terminal A to the handover target base station (step 1). In addition, at step 1, it also notifies of the active set for E-MBMS of the current mobile terminal A. The handover target base station receives the handover request and the active set for E-MBMS transmitted from the handover source base station (step 2). If the active set for E-MBMS for the mobile terminal A is notified by the processing at step 1, the handover target base station transmits an addition request for the active set for E-MBMS to the base stations included in the active set for E-MBMS at step 3. The handover target base station and base stations which receive the addition request for the active set for E-MBMS from the handover target base station prepare to transmit the E-MBMS data to the mobile terminal A.

At step 4, the handover target base station transmits a signal notifying of the authorization of the handover to the handover source base station, and at step 5, the handover source base station receives it. After completing the foregoing processing, the serving base station is switched from the handover source base station to the handover target base station at step 7, and the mobile terminal A receives the E-MBMS data transmitted from the base stations in the new active set for E-MBMS the handover target base station creates. On the other hand, since the handover source base station completes the role as the serving base station of the mobile terminal A, it performs the processing of deleting the active set for E-MBMS of the mobile terminal A after succeeding in the handover. After that, to select appropriate active set for E-MBMS, the handover target base station performs the processing of creating and deciding the active set for E-MBMS of the mobile terminal A at step 6. Since the details of the processing at step 6 are the same as those of the processing described with reference to FIG. 7, their description will be omitted here.

As described above, as to the E-MBMS service in particular, which is the broadcast service that transmits data from a plurality of base stations to a mobile terminal in the LTE communication system that employs OFDM, an access scheme comparatively weak at interference, as the downlink access scheme, it is important to set the number of the base stations included in the active set for E-MBMS at an appropriate value to make it compatible to maintain good reception quality and to prevent interference (and to make efficient use of the radio resources). The present invention performs the candidate base station selecting processing including: (1) the processing in which the mobile terminal measures the reception quality of each base station and obtains the measurement quality values; (2) the processing of making a decision as to whether the measurement quality value of the serving base station exceeds the threshold X notified by the serving base station; (3) the processing of adding the measurement quality values of other base stations to the measurement quality value of the serving base station until the resultant sum exceeds the threshold X notified by the serving base station; and (4) the processing of notifying the serving base station of the serving base station and other base stations included in the sum measurement quality value that exceeds the threshold X as the candidates for the active set for E-MBMS, thereby offering an advantage of being able to select as the active set for E-MBMS an appropriate number of base stations for making it compatible to maintain good reception quality and to prevent interference (and to make efficient use of the radio resources).

In addition, instead of the mobile terminal, a certain apparatus on the network side such as a base station and a base station control apparatus can perform the candidate base station selecting processing. For example, the mobile terminal performs the processing of measuring the reception quality of each base station and obtaining the measurement quality values, and notifies an apparatus on the network side such as the serving base station of the measurement result so that the serving base station can perform: (2) the processing of making a decision as to whether the measurement quality value of the serving base station exceeds the threshold X; (3) the processing of adding the measurement quality values of other base stations to the measurement quality value of the serving base station until the resultant sum exceeds the threshold X; and (4) the processing of deciding the serving base station and other base stations included in the sum measurement quality value that exceeds the threshold X as the active set for E-MBMS. In this case, the subject of performing the candidate base station selecting processing and the subject of performing the active set for E-MBMS selecting processing by receiving the result of the candidate base station selecting processing become the serving base station. This makes it possible to put the functions together.

Embodiment 2

In the embodiment 1, a description is made of the candidate base station selecting processing including: (1) the processing in which the mobile terminal measures the reception quality of each base station and obtains the measurement quality values; (2) the processing of making a decision as to whether the measurement quality value of the serving base station exceeds the threshold X notified by the serving base station; (3) the processing of adding the measurement quality values of other base stations to the measurement quality value of the serving base station until the resultant sum exceeds the threshold X notified by the serving base station; and (4) the processing of notifying the serving base station of the serving base station and other base stations included in the sum measurement quality value that exceeds the threshold X as the candidates for the active set for E-MBMS, and a description is made of the active set for E-MBMS selecting processing. In addition, a description is made that the active set for E-MEMS selecting processing mentioned above is executed when the serving base station is switched as the mobile terminal moves from a certain cell to another cell.

Figure 9:
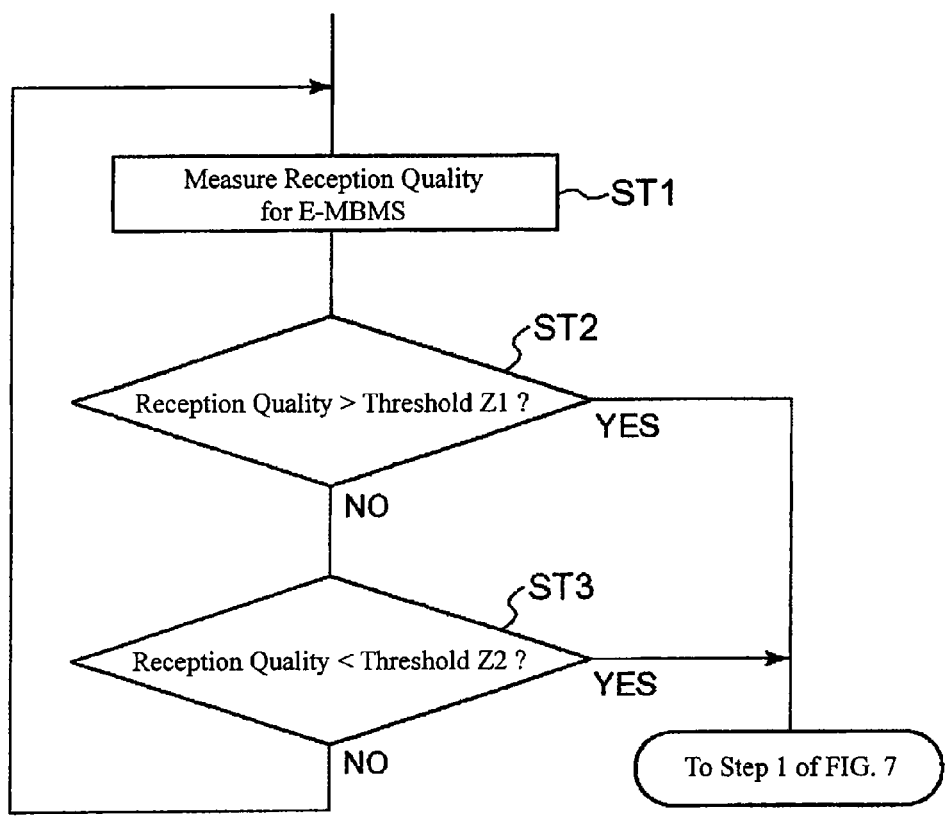
FIG. 9 is a flowchart for explaining processing of making a decision whether to carry out processing of creating the active set for E-MBMS.
Figure 10:
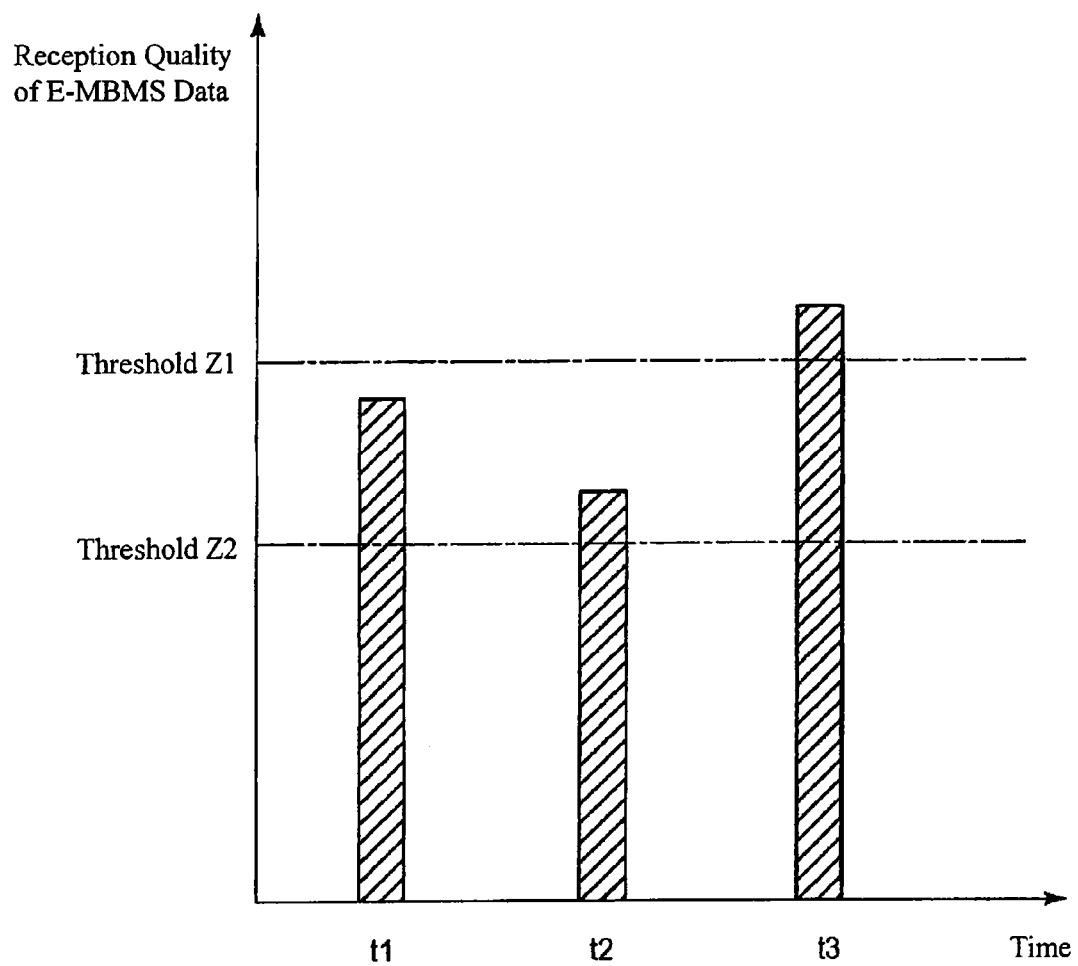
FIG. 10 is a diagram for explaining an idea of the processing of making a decision whether to carryout the processing of creating the active set for E-MBMS.

FIG. 9 is a flowchart for explaining the processing of making a decision whether to carry out the processing of creating the active set for E-MEMS. FIG. 10 is a diagram for explaining a concept of the processing of FIG. 9. The mobile terminal maintains good communication quality by receiving and combining the data from the base stations included in the active set for E-MBMS. At step 1, the mobile terminal measures the quality of the combined received signal acquired by receiving and combining signals from a plurality of base stations, and obtains a measurement quality value. As a parameter of the measurement quality of the E-MBMS data obtained by receiving and combining the data from the plurality of base stations, it is conceivable to use reception quality of the E-MBMS data (power, SIR and the like) at the frequency and time the E-MBMS data is really transmitted, or using a block error rate (BLER) of the E-MBMS data after decoding. Then, at step 2 and step 3, the mobile terminal compares the measurement quality value measured at step 1 with two thresholds Z1 and Z2.

The thresholds Z1 and Z2, of which the serving base station (or possibly aGW or service center) notifies the mobile terminal, can be transmitted through a logical channel such as BCCH, DCCH or MCCH, or can be mapped onto and transmitted through a transport channel such as BCH, DL-SCH or MCH. In addition, as the threshold X, the thresholds Z1 and Z2 can be varied in accordance with the degree of congestion of the scheduler and the amount of data transmitted by the E-MBMS service. The threshold Z1 is the upper limit threshold to be compared with the measurement quality values of E-MBMS data (of the combined received signal when combined). When the measurement quality values indicate that the quality is higher than the level defined by the threshold Z1, a decision is made that the selecting processing is necessary to reduce the number of base stations included in the active set for E-MBMS. The threshold Z2 is the lowest limit threshold to be compared with the measurement quality values of the E-MBMS data. When the measurement quality values indicate that the quality is lower than the level defined by the threshold Z2, a decision is made that the selecting processing is necessary to increase the number of base stations included in the active set for E-MBMS.

At step 2, if the measurement quality value is less than the threshold Z1 (No at step 2), step 3 is executed. If the measurement quality value is greater than the threshold Z1 (Yes at step 2), this means that the measurement quality value indicates the quality higher than the level defined by the threshold Z1. Accordingly, a decision is made that the current active set for E-MBMS is inappropriate. Thus, the processing at step 1 and forward of FIG. 7 is executed so that the base station candidates for the active set for E-MBMS are altered in such a manner as to reduce the number of the base stations included in the active set for E-MBMS. However, such a case is also conceivable where no alteration is made. As a concrete example, there is a case where if any one of the base stations is deleted from the candidate base stations for the active set for E-MBMS, the sum of the reception qualities does not exceeds the threshold X. At step 3, if the measurement quality value is greater than the threshold Z2 (No at step 3) as a result of comparing the measurement quality value with Z2, the measurement quality of the E-MBMS data the mobile terminal receives is in the range defined by the thresholds Z1 and Z2. Accordingly, a decision is made that the selection of the candidate base stations for the active set for E-MBMS is unnecessary. If the measurement quality value is less than the threshold Z2 (Yes at step 3), the measurement quality value does not reach the level defined by the threshold Z1. Accordingly, a decision is made that the current active set for E-MBMS is inappropriate. Thus, the processing at step 1 and forward of FIG. 7 is executed so that the active set for E-MBMS is altered in such a manner as to increase the number of the base stations included in the base station candidates for the active set for E-MBMS.

As shown in FIG. 10, it is found that the reception qualities of the E-MBMS data at time t1 and t2 are maintained at a certain level determined by the threshold Z1 and threshold Z2. In other words, as for the active set for E-MBMS at time t1 and t2, since the decision of No is made at step 2 and step 3 of FIG. 9, the current active set for E-MEMS is accepted as appropriate. On the other hand, it is found that the reception quality of the E-MBMS data at time t3 is not at a certain level determined by the threshold Z1 and threshold Z2, but exceeds the level determined by the threshold Z1. In other words, as for the active set for E-MBMS at time t3, since the decision of Yes is made at step 2 of FIG. 9, the current active set for E-MBMS is considered to be inappropriate. Thus, in the case of time t3, since the reception quality exceeds the level determined by the threshold Z1, revision is made in such a manner that a base station is deleted from the current base station candidates for the active set for E-MBMS.

As described above, as compared with the embodiment 1, the present embodiment 2 can make a decision as to whether the candidate base stations for the active set for E-MBMS are appropriate or not from the reception quality of the E-MBMS data the mobile terminal is actually receiving. In addition, it can reduce the number of executing the selecting processing of the candidate base stations for the active set for E-MBMS (FIG. 7), thereby being able to reduce the processing load.

Embodiment 3

In the embodiment 2, if the quality of the received signal the mobile terminal forms by receiving and combining signals from a plurality of base stations is greater than the receiving level defined by the threshold Z1 (Yes at step 2 of FIG. 9), or is less than the receiving level defined by the threshold Z2 (Yes at step 3 of FIG. 9), the decision is made that the current base station candidates for the active set for E-MBMS are inappropriate, and the selecting processing of the active set for E-MBMS shown in FIG. 7 is executed. However, frequently performing the candidate base station selecting processing as described in the embodiment 1 has some fear of increasing the processing load of the mobile terminal.

In view of this, if the decision of Yes is made at step 2 or step 3 of FIG. 9, the mobile terminal transmits to the serving base station a notification signal indicating simply "extra reception quality" or "bad reception quality" instead of executing the candidate base station selecting processing of FIG. 7. The signal notifying of "extra reception quality" transmitted from the mobile terminal indicates that a certain level of the reception quality can be maintained even if the number of the base stations included in the active set for E-MBMS is reduced. In this case, the processing is performed of deleting the base station geographically remotest from the serving base station in the active set for E-MBMS of the mobile terminal. On the other hand, the signal notifying of "bad reception quality" transmitted from the mobile terminal indicates that a certain level of the reception quality cannot be maintained unless the number of the base stations included in the active set for E-MBMS is increased. In this case, the processing is performed of adding the base station geographically closest to the serving base station in the base stations not included in the active set for E-MBMS of the mobile terminal. Adopting the method as described above can prevent the mobile terminal from executing the processing of selecting the candidate base stations, thereby being able to reduce the processing load of the mobile terminal.

Embodiment 4

As a result of measuring the quality of SCH by the mobile terminal, if the measurement quality of the base station C exceeds the measurement quality of the serving base station A as at time t4 of FIG. 6, a handover is usually performed to the base station C. In this case, the serving base station is changed from the base station A to the base station C. However, if the base station C is congested, there are some cases that are unsuitable for the handover because the load of its scheduler is very heavy. In such a case, as a handover target, the base station B that is not so busy as the base station C can be considered to be more appropriate though it is lower than the base station C in the reception quality of SCH.

As for the base station that will become a handover target in the future, it is preferable that it be included in the active set for E-MBMS before the handover to enable the mobile terminal to receive the E-MBMS data without any interruption at the handover. Thus, at time t4 of FIG. 6, the mobile terminal can select the base station C as a base station candidate for the active set for E-MBMS, considering that a handover can be made to the uncongested base station B in the future rather than to the congested base station C although the measurement quality of the base station B is inferior to the measurement quality of the base station C. Such a configuration makes it possible, in addition to the advantages of the foregoing embodiment 1, to select the active set for E-MBMS in accordance with the conditions of the mobile communication system such as the degree of congestion of the base station.

Embodiment 5

The embodiments 1-4 perform the candidate base station selecting processing including: (1) the processing of measuring the reception quality of each base station and obtaining the measurement quality values; (2) the processing of making a decision as to whether the measurement quality value of the serving base station exceeds the threshold X notified by the serving base station; (3) the processing of adding the measurement quality values of other base stations to the measurement quality value of the serving base station until the resultant sum exceeds the threshold X notified by the serving base station; and (4) the processing of notifying the serving base station of the serving base station and other base stations included in the sum measurement quality value that exceeds the threshold X as the candidates for the active set for E-MBMS, and receiving the result, the serving base station selects and determines the active set for E-MBMS. However, it is certainly one idea to decide the base stations to be included in the active set for E-MBMS in advance in accordance with the serving base station.

Figure 11:
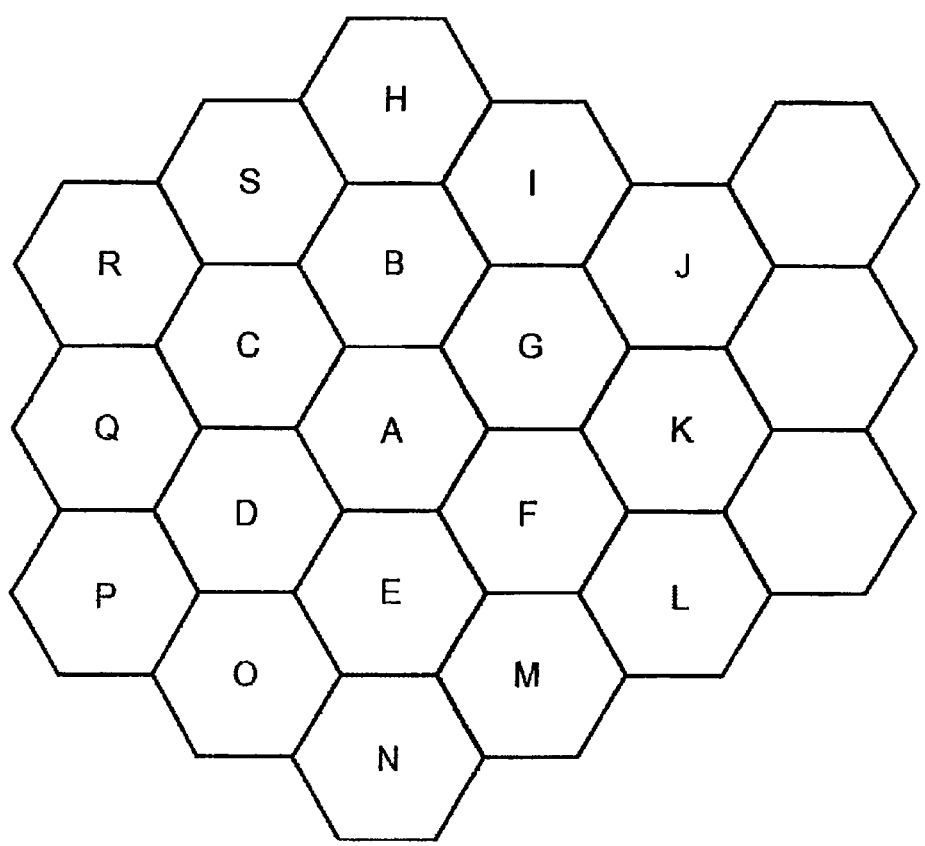
FIG. 11 is a diagram showing a set of cells controlled by base stations A-S.

FIG. 11 is a diagram showing a set of cells the base stations A-S manage. In FIG. 11, when the base station A is the serving base station, for example, the base stations B, C, D, E, F and G adjacent to the serving base station A are automatically decided as the active set for E-MBMS. The base stations A-G transmit the E-MBMS data to the mobile terminal. In addition, when the base station G is the serving base station, the base stations B, A, F, K, J and I adjacent to the serving base station G are decided as the active set for E-MBMS. The correspondence between the serving base station and the base stations included in the active set for E-MBMS can be kept in the form of a list. After receiving an entry for the E-MBMS service from the mobile terminal, the serving base station refers to the list, and decides the active set for E-MBMS for the mobile terminal that makes the entry.

Instead of deciding the base stations to be included in the active set for E-MBMS in advance in accordance with the serving base station, it is also possible to select them in accordance with conditions of the entire mobile communication system (such as the degree of congestion and the amount of data transmitted by the E-MBMS service). It can be implemented by providing several types of lists of eligible base stations decided in advance. For example, consider a handover (switching of the serving base station) when the mobile communication system is congested as a whole. Even in the case where the handover is to be made from the handover source base station (base station A) to its adjacent base station (base station B, for example) properly, if the base station B is congested (the load of its scheduler is very heavy), it is conceivable to perform the handover to the base station H which is not so busy as the base station B though inferior in the quality. To enable the mobile terminal to receive the E-MBMS data without interruption at the handover in the foregoing conditions, the handover target (base station H) must be included in the active set for E-MBMS before the handover.

Figure 12:
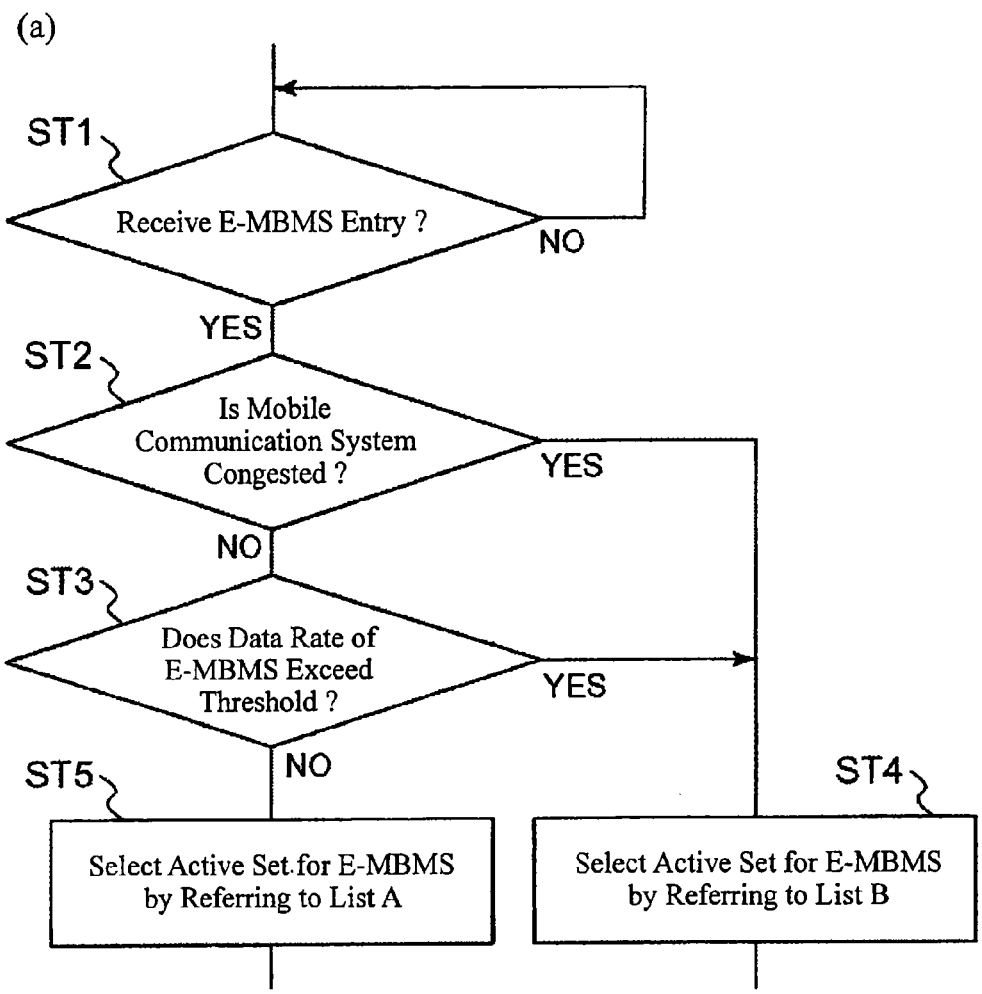
FIG. 12 is a flowchart for explaining processing of creating the active set for E-MBMS.

FIG. 12 is a flowchart for explaining processing of creating the active set for E-MBMS. At step 1, receiving an E-MBMS entry from the mobile terminal (Yes at step 1), the serving base station makes a decision as to whether the mobile communication system is congested. If the mobile communication system is congested (Yes at step 2), the more the number of the candidate base stations for the handover is, the better. Thus, the serving base station employs the list B of FIG. 12(b), and selects the base stations A-S as the active set for E-MBMS. On the other hand, when the mobile communication system is not congested (No at step 2), the serving base station makes a decision at step 3 on whether the data rate of the E-MBMS exceeds a threshold. The threshold is used for selecting the list A or list B, and when the data rate is relatively high, the list B is employed. Thus, if the data rate exceeds the threshold (Yes at step 3), the serving base station employs the list B of FIG. 12(b), and selects the base stations A-S as the active set for E-MBMS. On the other hand, unless the data rate exceeds the threshold (No at step 3), it employs the list A, and selects the base stations A-G as the active set for E-MBMS.

As described above, concerning the entry from the mobile terminal, the active set for E-MBMS is selected by referring to the list of the neighboring base stations determined in advance. This offers an advantage of being able to select the appropriate active set for E-MBMS quickly after the serving base station receives the E-MBMS service entry from the mobile terminal. In addition, as compared with the method described in the embodiment 1, since it is unnecessary for the mobile terminal to notify the serving base station of any information other than the E-MBMS entry (such as the notification of the measurement result from the mobile terminal to the serving base station), the present embodiment 5 offers an advantage of being able to make effective use of the radio resources. Furthermore, the active set for E-MBMS can be selected by referring to the list of eligible base stations decided in advance. This offers an advantage of being able to obviate the need for performing processing of selecting appropriate base stations as the active set for E-MBMS, thereby being able to reduce the load of the serving base station. Moreover, since it is not necessary to measure the reception quality from the base stations for selecting the active set for E-MBMS, or to notify the serving base station of the measurement result, there is an advantage of being able to reduce the load of the mobile terminal. In addition, it becomes possible to select the active set for E-MBMS suitable for the conditions of the mobile communication system. As an example of a concrete advantage, there is an advantage of being able to receive the E-MBMS data without interruption at the handover independently of the degree of congestion of the mobile communication system.

As for the processing executed at the handover, it is described in connection with the embodiment 1. It is possible for the embodiment 5 to perform the same handover processing as in the embodiment 1. In this case, however, although in the embodiment 1 the serving base station selects the active set for E-MBMS by using the candidate base stations for the active set for E-MBMS obtained from the measurement result by the mobile terminal, in the embodiment 5 the serving base station selects the active set for E-MBMS by referring to the lists without using the candidate base stations for the active set for E-MBMS by the mobile terminal. Accordingly, the handover target base station can decide the active set for E-MBMS of the handover target base station by referring to the lists immediately after receiving the handover request at step 2 of FIG. 8. This makes it possible to omit step 6 of FIG. 8. In addition, the present embodiment 5 can achieve an advantage of being able to decide the optimum base stations to be included in the active set for E-MBMS in the handover target base station quickly.

What is claimed is:

1. A communication method for transmitting E-MBMS (Evolved Multimedia Broadcast Multicast Service) data to a mobile terminal, comprising:

receiving, by a serving base station, an E-MBMS service entry request from a mobile terminal;

receiving, by the serving base station from the mobile terminal, a plurality of candidates to be included in an active set of base stations, wherein each candidate of the plurality of candidates transmits a reference symbol to the mobile terminal at a frequency band of the E-MBMS transmission, wherein each candidate is selected based on a signal quality of the reference symbol, selecting, by the serving base station, based on the plurality of candidates received from the mobile terminal and a signal quality pre-determined threshold, the active set of at least one base station for E-MBMS transmission for the mobile terminal, where the signal quality of the reference symbol of the active set exceeds the signal quality pre-determined threshold; and transmitting the E-MBMS data from the active set of at least one base station to the mobile terminal.

2. The communication method according to claim 1, wherein the active set is selected by choosing the highest quality signal base stations until the pre-determined signal quality threshold is exceeded.

3. The communication method according to claim 1, wherein the active set is selected by choosing the base stations that will exceed the pre-determined signal quality threshold by the least amount.

* * * * *